United States Patent
Pinola et al.

(10) Patent No.: US 6,799,023 B2
(45) Date of Patent: Sep. 28, 2004

(54) METHOD OF AUTOMATIC GAIN CONTROL IN BASE STATION OF CELLULAR RADIO NETWORK

(75) Inventors: Timo Pinola, Oulu (FI); Kari Haataja, Hampshire (GB)

(73) Assignee: Nokia Networks Oy, Espoo (FI)

( * ) Notice: Subject to any disclaimer, the term of this patent is extended or adjusted under 35 U.S.C. 154(b) by 566 days.

(21) Appl. No.: 09/930,497

(22) Filed: Aug. 16, 2001

(65) Prior Publication Data

US 2002/0032013 A1 Mar. 14, 2002

Related U.S. Application Data

(63) Continuation of application No. PCT/FI00/00123, filed on Feb. 17, 2000.

(30) Foreign Application Priority Data

Feb. 18, 1999 (FI) .................................................. 990354

(51) Int. Cl.⁷ ................................................ H04B 1/06
(52) U.S. Cl. .................... 455/234.1; 455/561; 370/347; 375/345
(58) Field of Search ............................ 455/67.11, 136, 455/226.1, 226.2, 232.1, 234.1, 234.2, 245.1, 249.1, 250.1, 560, 561; 370/337, 345, 347, 442; 375/345

(56) References Cited

U.S. PATENT DOCUMENTS

| 5,184,349 A | * | 2/1993 | Riordan .................. 455/234.1 |
| 5,204,976 A | * | 4/1993 | Baldwin et al. ......... 455/234.2 |
| 5,493,712 A | * | 2/1996 | Ramesh et al. .......... 455/234.2 |
| 5,535,238 A | | 7/1996 | Schilling et al. |
| 5,574,747 A | | 11/1996 | Lomp |
| 5,854,972 A | | 12/1998 | Pennock et al. |
| 6,430,173 B1 | * | 8/2002 | Posti et al. ................. 370/347 |

FOREIGN PATENT DOCUMENTS

| FI | 97929 | 3/1997 |
| WO | WO 92/13404 | 8/1992 |
| WO | WO 95/08878 | 3/1995 |
| WO | WO 99/01949 | 6/1998 |

* cited by examiner

Primary Examiner—Quochien B. Vuong
(74) Attorney, Agent, or Firm—Pillsbury Winthrop LLP (57) ABSTRACT

The invention relates to a method of automatic gain control (AGC) in a base station of a cellular radio network and to a network part in a cellular radio network. The method comprises receiving at least one random access burst transmitted by a subscriber terminal of the cellular radio network on a random access channel. Then the received power of the random access burst is measured, followed by generating subscriber terminal-specific AGC data on the basis of the received power of at least one random access burst. Then, subscriber terminal-specific AGC data is stored. Next, a normal burst transmitted by the subscriber terminal on a stand-alone dedicated control channel is received, and the gain of the normal burst received is controlled by the subscriber terminal-specific AGC data. Finally, the controlled normal burst is subjected to analog-to-digital conversion.

16 Claims, 6 Drawing Sheets

METHOD OF AUTOMATIC GAIN CONTROL IN BASE STATION OF CELLULAR RADIO NETWORK

This application is a Continuation of International Application PCT/FI00/00123 filed on 17 Feb. 2000 which designated the U.S. and was published under PCT Article 21(2) in English.

FIELD

The invention relates to a method of automatic gain control in a base station, particularly in its receiver, in a cellular radio network.

BACKGROUND

Automatic gain control (AGC) refers to a feedback control circuit for maintaining amplifier gain, that is, output power level, within a given power range, even though the input power level of the amplifier may vary within a given, even wide, range. If such control does not exist, signal clipping occurs in the amplifier or in a subsequent analog-to-digital converter when it receives too strong a signal, the clipping causing signal distortion. For example in audio equipment, the distortion can be heard as sonic distortion.

Figure 3A:
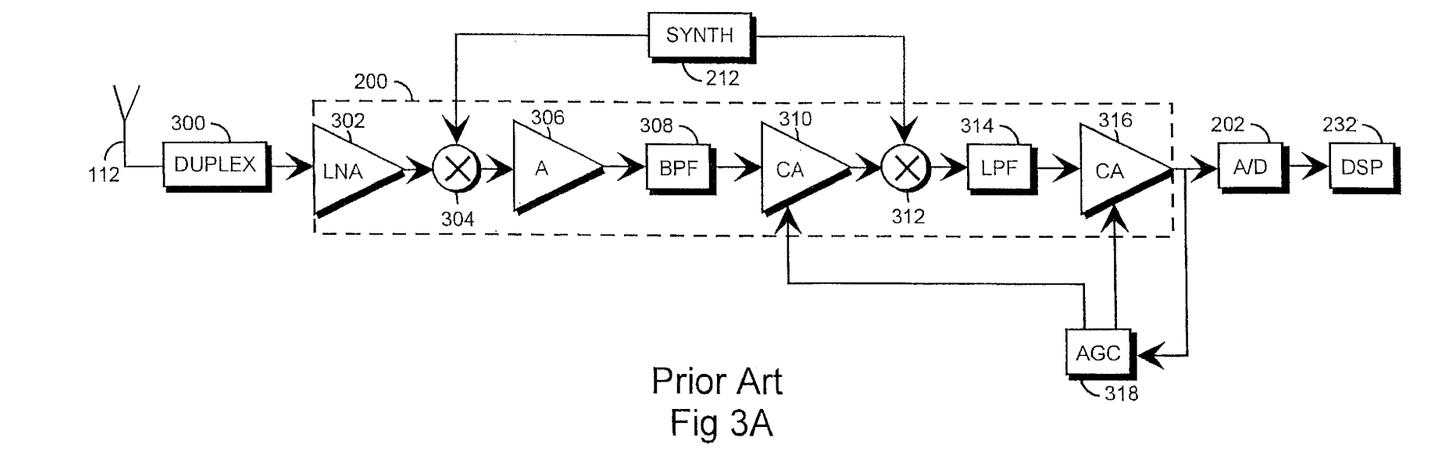
FIGS. 3A and 3B show known solutions for AGC in a base station as discussed above.

A known way to implement AGC in a receiver of a base station is shown in FIG. 3A. A signal received from the radio path by an antenna 112 is applied via a duplex filter 300, which separates reception and transmission directions, to a radio frequency receiver 200. In the radio frequency receiver 200, the radio frequency signal is first applied to a low-noise amplifier 302. The signal is then converted to an intermediate frequency by multiplying 304 it by a signal at a suitable frequency.

A synthesizer 212 arranges the frequencies required by the different units. The clock comprised by the synthesizer 212 can be locally controlled or controlled in a centralized manner from somewhere else, from a base station controller controlling the base station, for example. The synthesizer 212 creates the necessary frequencies by a voltage-controlled oscillator, for example. Then the signal is again amplified in an amplifier 306. The signal is then filtered in a band-pass filter 308 which eliminates frequencies outside the desired frequency band. Next, the signal is amplified or attenuated by a adjustable amplifier 310. Then the signal is converted to the baseband by multiplying 312 it with a signal generated by the local synthesizer 212.

Next, the signal is filtered with a low-pass filter 314 which lets signal frequencies under a given frequency to pass through. The signal is then either amplified or attenuated with a second adjustable amplifier 316. Finally, having been converted to the baseband, filtered and amplified/attenuated, the signal is sampled and quantized in a relatively slow analog-to-digital converter 202, followed by further processing of the signal in a digital form with a digital signal processing processor 232 and its software.

Actual AGC is carried out in block 318, shown in FIG. 3A, where the power level of the analog signal is measured, and said power level is used to decide how the signal will be amplified/attenuated with the adjustable amplifiers 310, 316, for its amplitude to be within the allowed power range of the analog-to-digital converter. The solution works, but is relatively expensive, since it is the gain of an analog signal that is measured and controlled.

Figure 3B:
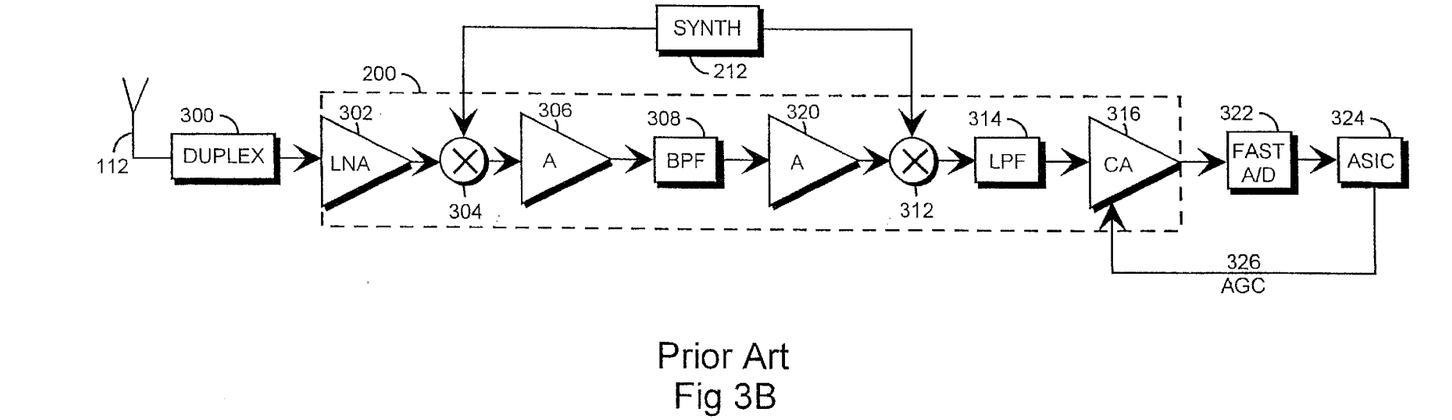

Another known way to implement AGC in a receiver of a base station is shown in FIG. 3B. The solution is quite similar to the one shown in FIG. 3A, however, with the following exceptions:

the adjustable amplifier 310 is replaced with a normal amplifier 320, in lieu of a relatively slow analog-to-digital converter 202, a very fast analog-to-digital converter 322 is used, in lieu of a separate circuit 318 measuring an analog signal, AGC is implemented by a special application specific integrated circuit (ASIC) 324, which adjusts only one adjustable amplifier 316.

Thus the signal gain measurements required by the control are carried out on a digital signal. The disadvantage of the second solution is that the fast analog-to-digital converter 322 and the special ASIC are expensive. Typically, two samples for each symbol are taken in a slow analog-to-digital converter, while in the fast one, even hundreds of samples are taken for each symbol, i.e. oversampling takes place.

BRIEF DESCRIPTION OF THE INVENTION

It is an object of the invention to provide a method and an apparatus for implementing the method so as to solve the above problems. This is achieved by the method which is discussed next. A method is provided for automatic gain control in a base station of a cellular radio network, comprising: receiving at least one random access burst transmitted by a subscriber terminal of the cellular radio network on a random access channel; measuring the received power of the random access burst; generating subscriber terminal-specific AGC data on the basis of the received power of at least one random access burst. In the method, subscriber terminal-specific AGC data is stored; a normal burst transmitted by the subscriber terminal on a stand-alone dedicated control channel is received; the gain of the normal burst received is controlled by the subscriber terminal-specific AGC data; an analog-to-digital conversion is performed on the controlled normal burst.

The invention also relates to a network part in a cellular radio network, comprising: a receiver for receiving at least one random access burst transmitted by a subscriber terminal of the cellular radio network on a random access channel; means for measuring the received power of the random access burst; control means for generating subscriber terminal-specific AGC data on the basis of the received power of at least one random access burst.

The base station further comprises: means for storing the subscriber terminal-specific AGC data; a receiver (200) for receiving the normal burst transmitted by the subscriber terminal on a stand-alone dedicated control channel; means for controlling the gain of the received normal burst by the stored subscriber terminal-specific AGC data; an analog-to-digital converter for performing analog-to-digital conversion on the controlled normal burst.

The preferred embodiments of the invention are described in the dependent claims.

The invention is based on utilizing an inexpensive, slow analog-to-digital converter and an intelligent way to implement AGC in place of the expensive solutions described. During the long tail bits of a random access burst, AGC can be performed, and once the AGC data is stored, it can also be used to perform AGC of a normal burst, even on a stand-alone dedicated control channel without the connection being cut. Consequently, the invention implements a kind of fast AGC with slow components.

The method and system of the invention provide several advantages. The structure of the base station receiver becomes simpler, resulting in less costs and an increased reliability of operation.

BRIEF DESCRIPTION OF THE DRAWINGS

In the following, the invention will be described in greater detail in conjunction with preferred embodiments, reference being made to the attached drawings, in which.

DESCRIPTION OF EMBODIMENTS

Figure 1:
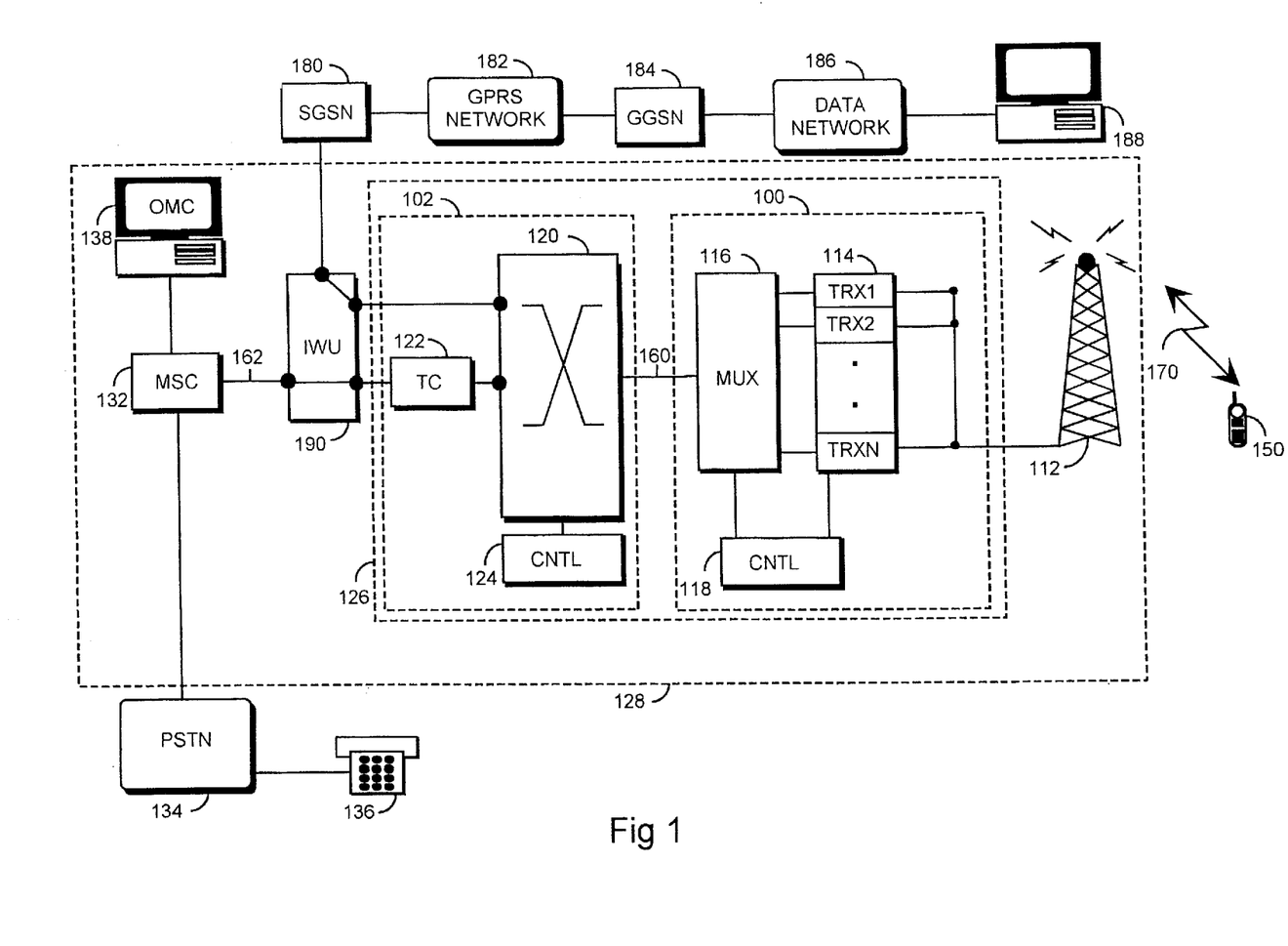
FIG. 1 shows a cellular radio network.

Referring to FIG. 1, a typical structure of the cellular radio network of the invention is described. FIG. 1 shows only the blocks relevant to understanding the invention, and it is obvious to a person skilled in the art that a conventional cellular radio network also comprises other functions and structures, which need not be explained in greater detail herein. The examples illustrate a GSM cellular radio network using TDMA (Time Division Multiple Access), without, however, any restriction thereto.

A cellular radio network typically comprises a fixed network infrastructure, that is, a network part 128, and subscriber terminals 150, which may be fixedly located, vehicle-mounted or hand-held portable terminals. The network part 128 comprises base stations 100. A base station controller 102 communicating with a plurality of base stations 100 controls them in a centralized manner. A base station 100 comprises transceivers 114. A base station 100 typically comprises between one and sixteen transceivers 114. For example in TDMA radio systems, one transceiver 114 offers radio capacity to one TDMA frame, i.e. typically to eight timeslots.

The base station 100 comprises a control unit 118 for controlling the operation of the transceivers 114 and a multiplexer 116. The traffic and control channels used by a plurality of transceivers 114 are placed on one transmission link 160 by the multiplexer 116.

The transceivers 114 of the base station 100 are connected to an antenna unit 112 for implementing a bidirectional radio connection 170 to the subscriber terminal 150. In a bi-directional radio connection 170, the structure of frames to be transferred is strictly defined, and is called an air interface.

Figure 2:
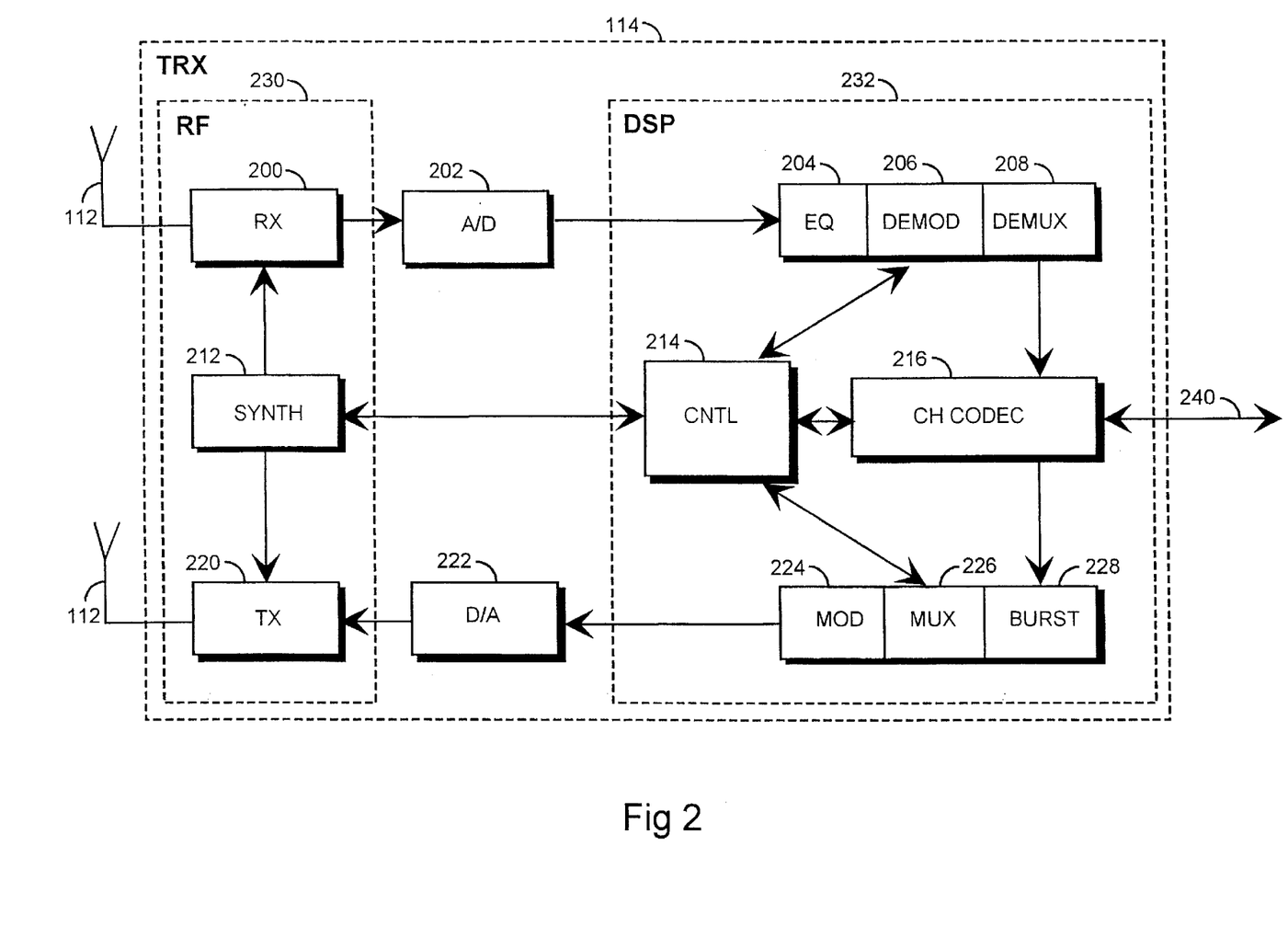
FIG. 2 shows a transceiver.

FIG. 2 shows the structure of a transceiver 114 in greater detail. FIG. 3A and 3B show the structure of a known radio frequency receiver 200. The signal, converted, filtered and amplified/attenuated to the baseband, is then sampled and quantized in a relatively slow analog-to-digital converter 202. An equalizer 204 compensates for interference caused by multipath propagation, for example. From the equalized signal, a demodulator 206 takes a bit stream which is transferred to a demultiplexer 208. From different timeslots, the demultiplexer 208 separates the bit stream to specific logical channels. A channel codec 216 decodes the bit streams of the different logical channels, that is, decides if the bit stream is signalling information to be transferred to a control unit 214, or if the bit stream is speech to be transferred 240 to a speech codec 122 at the base station controller 102. The channel codec 216 also performs error correction. The control unit 214 performs internal control tasks by controlling the different units. A burst generator 228 adds a training sequence and a tail to the data coming from the channel codec 216. A multiplexer 226 assigns a timeslot to each burst. A modulator 224 modulates the digital signals to a radio frequency carrier. This function is inherently analog and consequently requires a digital-to-analog converter 222. A transmitter 220 comprises a filter for limiting the bandwidth. In addition, the transmitter 220 controls the output power level of the transmission. A synthesizer 212 arranges the frequencies required for the different units. The clock composed by the synthesizer 212 can be locally controlled or it can be controlled in a centralized manner from somewhere else, from the base station controller 102, for example. The synthesizer 212 generates the necessary frequencies by a voltage-controlled oscillator, for example.

FIG. 2 shows a manner of dividing the structure of a transceiver further into radio frequency parts 230 and a digital signal processing processor including software 232. The radio frequency parts 230 include the radio frequency receiver 200, the radio frequency transmitter 220 and the synthesizer 212. The digital signal processing processor and software 232 include the equalizer 204, the demodulator 206, the demultiplexer 208, the channel codec 216, the control unit 214, the burst generator 228, the multiplexer 226 and the modulator 224.

The base station controller 102 comprises a switching field 120 and a control unit 124. The switching field 120 is used to switch speech and data and to combine signalling circuits. The base station system 126, composed of the base station 100 and the base station controller 102, also comprises a transcoder 122. The transcoder 122 is usually located as near as possible to a mobile switching centre 132, since in that case speech can be transferred in the format of the cellular radio network between the transcoder 122 and the base station controller 102, thus saving transmission capacity. In the UMTS (Universal Mobile Telephone System) system, a base station controller 102 may be called an RNC (Radio Network Controller).

The transcoder 122 converts the different digital speech encoding formats used between a public telephone network and a radio telephone network into a format suitable for one another, for example from the 64 kbit/s format of a fixed network to another (13 kbit/s, for example) format of a cellular radio network, and vice versa. The control unit 124 carries out speech control, mobility management, collection of statistics and signalling.

In the UMTS system, an IWU 190 (Interworking Unit) serves to adapt the base station system 126 to a second generation GSM mobile switching centre 132 or to a second generation packet transmission network support node 180. In accordance with FIG. 1, a circuit-switched connection can be set up from the subscriber terminal 150 via the mobile switching centre 132 to a telephone 136 connected to the public switched telephone network 134 (PSTN). A cellular radio network may also employ a packet-switched connection, for example phase 2+ packet transmission, i.e. GPRS (General Packet Radio Service), of the GSM system. A support node 180 (SGSN=Serving GPRS Support Node) creates the connection between a packet-switched network 182 and the IWU 190. The support node 180 serves to transfer packets between the base station system and a gateway node 184 (GGSN=Gateway GPRS Support node) and to keep a record of the location of the subscriber terminal 150 within its area.

The IWU 190 may be a physically separate device, as in FIG. 1, or it may be integrated into a part of the base station controller 102 or the mobile switching centre 132. As FIG. 1 shows, in packet transmission, if transcoding of the data to be transmitted is not permitted, the data is not necessarily transferred through the transcoder 122 between the IWU 190 and the switching field 120.

The gateway node 184 connects a public packet-switched network 186 and the packet-switched network 182. The Internet protocol or the X.25 protocol can be used at the interface. The gateway node 184 hides the internal structure of the packet-switched network 182 by encapsulation from the public packet-switched network 186, and consequently the public packet-switched network 186 sees the packet-switched network 182 as a sub-network to a subscriber terminal 150 within which the public packet-switched network can address packets and from which packets can be received.

Typically, the packet-switched network 182 is a private network which uses the Internet protocol and conveys signalling and tunneled user data. The structure of the network 182 may vary operator-specifically both regarding its architecture and its protocols under the Internet protocol layer.

The public packet-switched network 186 may be the global Internet, for example, with which a terminal 188, a server, for example, communicates and wishes to transfer packets to the subscriber terminal 150.

An OMC (Operations and Maintenance Centre) communicates with the mobile switching centre 132 and controls and monitors the operation of the radio telephone system. The operations and maintenance centre 132 is typically a quite powerful computer having special software. Control may also be directed to separate system parts, since control channels required for the transmission of control data can be placed on data transmission links between different system parts. Furthermore, the personnel installing the network and monitoring its use may have at their disposal a portable computer and software 140 (EM=Element Manager) for controlling separate network elements.

The structure of the subscriber terminal 150 can be described by utilizing the description of the structure of the transceiver 114 in FIG. 2. The components of the subscriber terminal 150 are functionally the same as those of the transceiver 114. In addition, the subscriber terminal 150 comprises a duplex filter between the antenna 112 and the receiver 200 and the transmitter 220, user interface parts and a speech codec. The speech codec is linked via a bus 240 to the channel codec 216.

Figure 6:
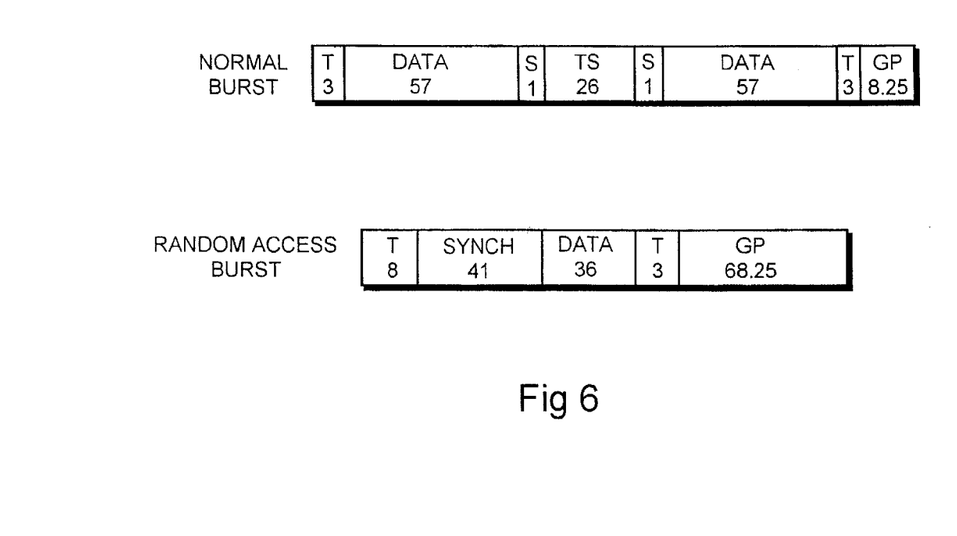
FIG. 6 shows the structure of a normal burst and a random access burst used in a cellular radio network.

An example of a cellular radio network in which the invention is used has now been described, and hence the steps of the method of the invention can be described with reference to FIG. 4. The method for AGC in a base station 100 of a cellular radio network comprises, as the first actual step after initiation, block 400 in which at least one random access burst transmitted by a subscriber terminal 150 of the cellular radio network on a random access channel is received. The subscriber terminal uses the random access channel to request from a network part 128 a dedicated channel for an active connection, a call or packet transmission, for example. FIG. 6 shows the structures of a normal burst and a random access burst. The end of a normal burst comprises an 8.25-bit guard period GP which is reserved for ramping up the transmission power of the burst. At the beginning of a normal burst and at end, before the guard period, the burst comprises a three-bit field T, comprising tail bits. The tail bits cover an uncertainty period during increase and decrease in transmission power. Approximately in the middle of the burst is a 26-bit training sequence TS which contains the known bits and which the receiver uses in channel estimation. On both sides of the training sequence are one-bit long stealing flags which indicate to the receiver if said burst contains signalling information or user payload. Between the tail bits and the stealing flag fields are two 57-bit fields DATA, which contain the transmitted encoded data. The structure of a random access burst is partly equal to that of a normal burst. The purpose of a synchronization sequence SYNCH is the same as that of the training sequence, with the exception that it is longer, i.e. 41 bits, since the receiver spends more time on synchronizing with a first new random access burst to be transmitted. There is only one data field, a 36-bit field DATA. The 68.25-bit guard period GP is significantly longer than the guard period of a normal burst. Tail bits are also in two fields T, at the beginning of the burst 8 tail bits, and at the end 3 bits.

Next, in block 402, the received power of the random access burst is measured. The power is measured in a manner known in the prior art, and is therefore not described in greater detail herein. The power of either an analog or a digital signal can be measured.

Next, in block 404, subscriber terminal-specific 150 AGC data is generated on the basis of the received power of at least one random access burst. Now the tail bit field, which is longer than what is normal, at the beginning of the random access burst, is of benefit, since during said tail bits the receiver has time to compute suitable AGC data for the end part of the random access burst to be received. In the case of more than one random access bursts, the control data can be generated on the basis of the received power of an individual random access burst or that of the one which was received last, or according to an average calculated for the received power of random access bursts.

In block 406, subscriber terminal-specific 150 AGC data is stored, i.e. the AGC data calculated on the basis of the random access burst in block 404 is stored in a manner allowing later identification of the subscriber terminal 150 with which each stored control data is associated.

Once the network part 128 has successfully received a random access burst, in a connection initiated by the subscriber terminal 150, the network part 128 next transmits on an access grant channel an indication of which dedicated channel the subscriber terminal 150 is allowed to use. The subscriber terminal 150 may then transmit a normal burst on a stand-alone dedicated control channel.

In block 408, the normal burst transmitted by the subscriber terminal 150 on a stand-alone dedicated control channel is received.

In block 410, the gain of the normal burst received is controlled by the stored subscriber terminal-specific 150 AGC data. In block 412, the controlled normal burst is subjected to analog-to-digital conversion. If AGC data used on the connection set up by said subscriber terminal 150 had not been stored in step 406, the problems described above could arise at this point, i.e. subjecting too strong a signal to analog-to-digital conversion causes signal clipping, and too much information is lost. Clipping may also take place in an amplifier. Such a burst could no longer be decoded and, because of short time-outs in protocol processing, connection set-up would be likely to fail, and had to be resumed from the beginning. Even though the beginning of a normal burst only comprises three tail bits, there is time to subject said burst to the right gain control, since the control data used for the random access burst has been stored. The distance and audibility of the subscriber terminal 150 relative to the base station 100 have not had time to change significantly, whereby the control data used for the random access burst still sufficiently accurately corresponds to the circumstances when the normal burst was received.

In a preferred embodiment, a normal burst transmitted by the subscriber terminal is received and its gain is controlled by the stored subscriber terminal-specific AGC data. In other words, this is as if a continuation to the above described basic method, i.e. the AGC data of a burst received on a stand-alone dedicated random access channel is utilized on a traffic channel.

Figure 4:
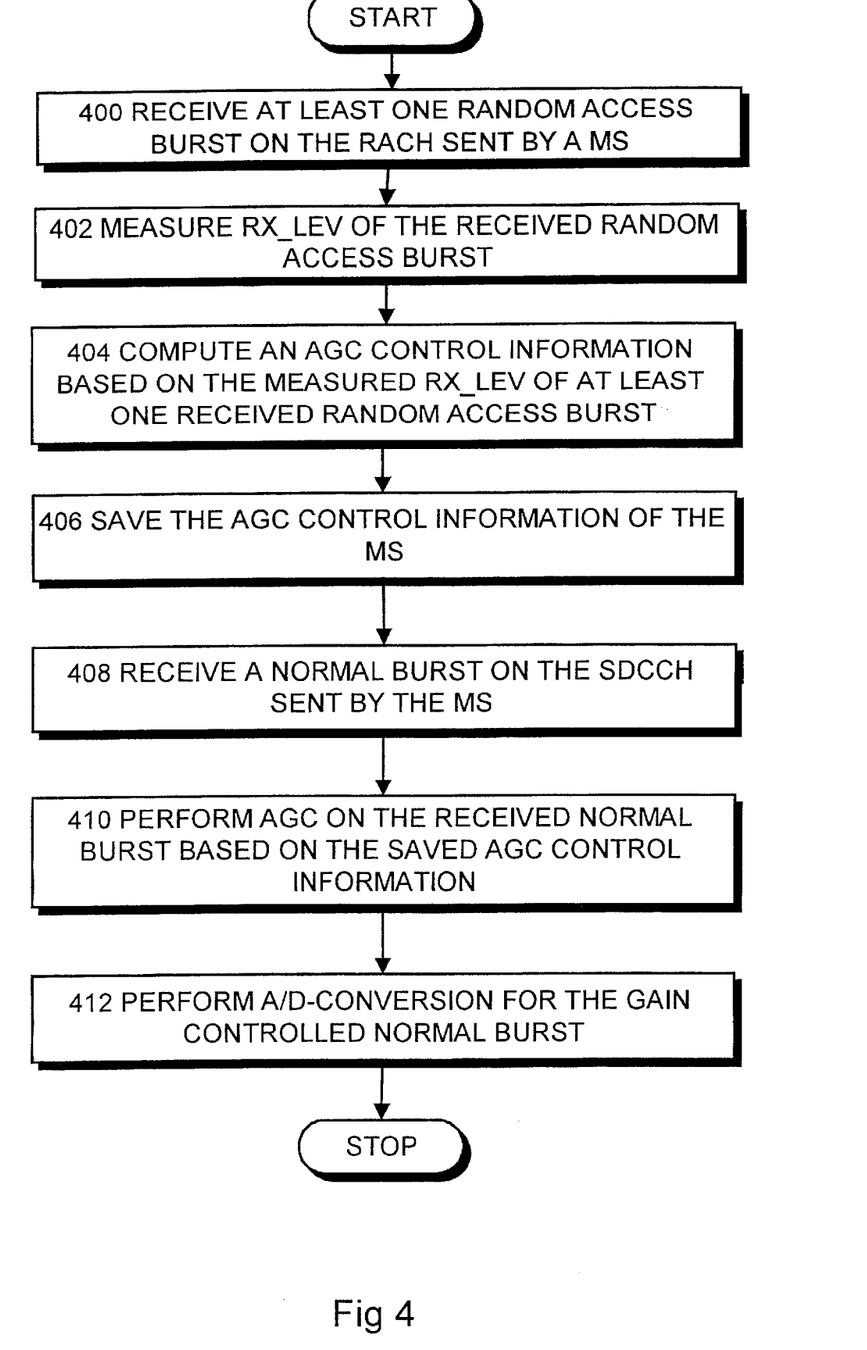
FIG. 4 is a flow diagram showing the control method of the invention.
Figure 5:
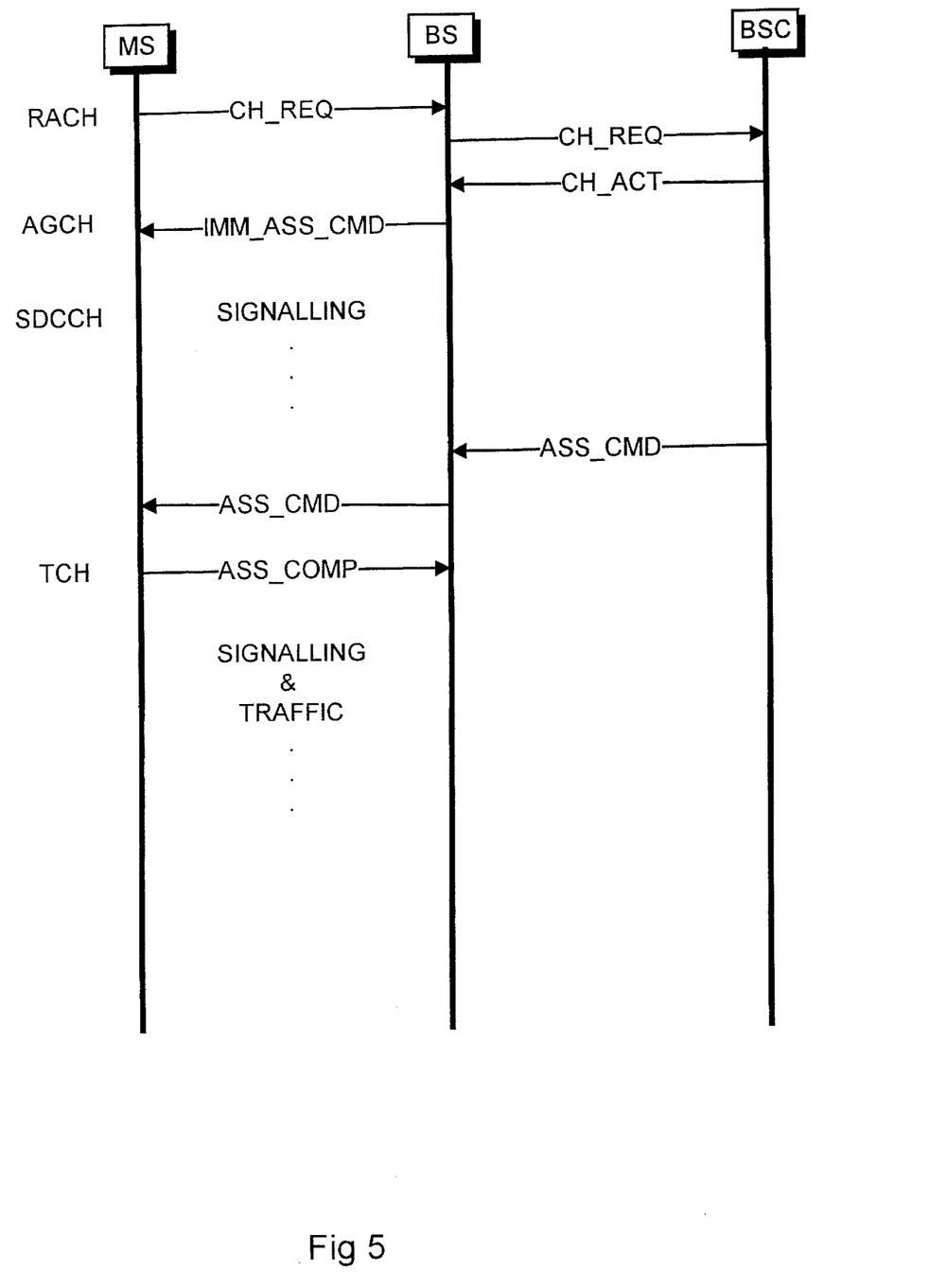
FIG. 5 is a simplified signal sequence diagram showing messages between a network and a subscriber terminal upon set-up of a call.

FIG. 5 is a signal sequence diagram showing how the method shown in FIG. 4 progresses. First, a subscriber terminal MS transmits on a random access channel RACH a channel request CH_REQ to a base station BS which forwards the channel request CH_REQ to a base station controller BSC. At this stage, the base station stores identifier data on the subscriber terminal and AGC data used in the reception of a random access burst. The identifier data can be a RANDOM_REFERENCE in the random access burst, for example, or some other information identifying the subscriber terminal.

The base station controller BSC then addresses a channel activation request CH_ACT to the base station BS which sends on an access grant channel AGCH to the subscriber terminal MS an immediate assignment command IMM_ASS_CMD for commanding the subscriber terminal 150 to continue communication on the stand-alone dedicated control channel SDCCH assigned for the use of the connection. Before the change over to the stand-alone dedicated control channel SDCCH occurs, the right gain control data to be used in the base station is obtained as follows: the subscriber terminal identifier data and the stand-alone dedicated control channel data are read from an immediate channel assignment command IMM_ASS_CMD, the stored subscriber terminal identifier data and the AGC data corresponding to said identifier data are retrieved, and the receiver is adjusted by the subscriber terminal-specifically stored AGC data to receive said stand-alone dedicated control channel. The actual traffic channel is assigned to the use of the connection by the SIGNALLING which continues on the stand-alone dedicated control channel by the use of AGC. The base station controller BSC transmits to the base station BS an assignment command ASS_CMD which the base station BS relays to the subscriber terminal MS. The subscriber terminal MS acknowledges the traffic channel assignment by a separate message ASS_COMP which it sends to the base station BS on a traffic channel TCH. Other necessary signalling can then take place on the traffic channel TCH, and actual communication may start. The traffic channels may also use the AGC of the invention.

Figure 3C:
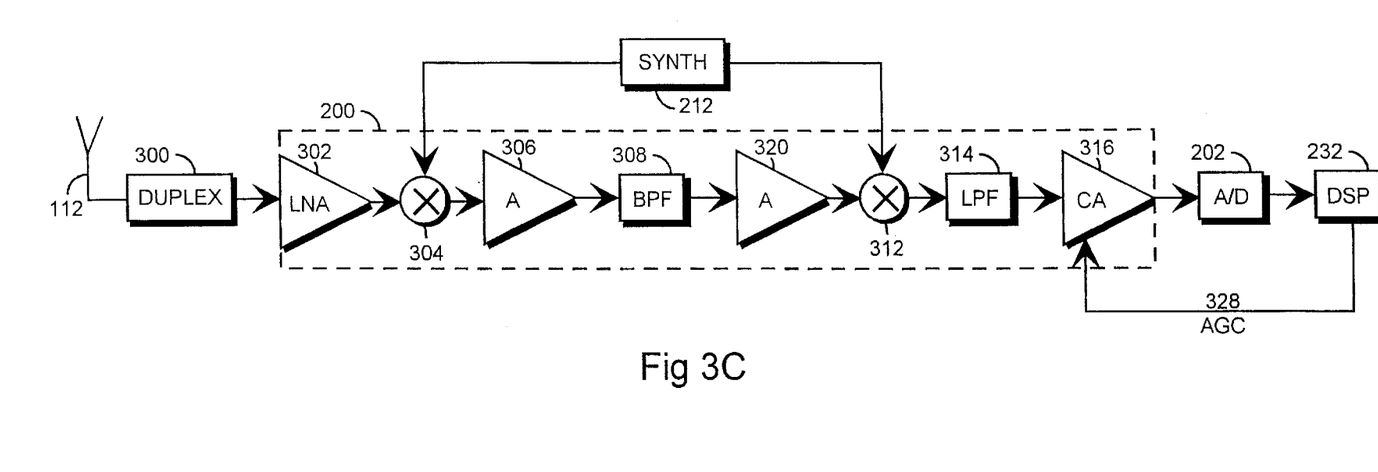
FIG. 3C shows the solution of the invention for AGC in a base station.

FIG. 3C shows an example of the structure of a receiver in a base station using the method of the invention. An antenna 112 conveys a signal received from the radio path via a duplex filter 300, which separates the reception and transmission directions, to a radio frequency receiver 200. In the radio frequency receiver 200, the radio frequency signal is first applied to a low-noise amplifier 302. The signal is then converted to an intermediate frequency by multiplying 304 it with a signal at a suitable frequency. A synthesizer 212 arranges the frequencies required by the different units. The clock comprised by the synthesizer 212 can be locally controlled or controlled in a centralized manner from somewhere else, from a base station controller controlling the base station, for example. The synthesizer 212 creates the necessary frequencies by a voltage-controlled oscillator, for example. Then the signal is again amplified in an amplifier 306. The signal is then filtered in a bandpass filter 308 which eliminates frequencies outside the desired frequency band. Next, the signal is amplified or attenuated by an amplifier 320. Then the signal is converted to the baseband by multiplying 312 it with a signal generated by the local synthesizer 212. Next, the signal is filtered with a low-pass filter 314 which lets signal frequencies under a given frequency to pass through. The signal is then either amplified or attenuated with a second adjustable amplifier 320.

Finally, having been converted to the baseband, filtered and amplified/attenuated, the signal is sampled and quantized in a relatively slow analog-to-digital converter 202, followed by further processing of the signal in a digital form with a digital signal processing processor 232 and its software. AGC is slow, in other words the analog-to-digital converter 202 is slow: the sampling frequency in the analog-to-digital converter 202 is about 2 to 10 samples per symbol.

It is obvious that the structure described in only an example of a potential structure: different numbers and combinations of filters and amplifiers are feasible. In the invention, only the implementation of AGC, to be described next, is essential.

Actual AGC is preferably carried out by software to be executed in a digital signal processing processor 232 or in some other processor. The functionality of the software can also be implemented as a hardware solution, as an ASIC or discrete logic, for example. The software comprises for example the following parts as program modules. A first module comprises means 232 for measuring the received power of a random access burst. A second module comprises control means 232 for generating subscriber terminal-specific 150 AGC data on the basis of the received power of at least one random access burst. A third module comprises means 232 for storing the subscriber terminal-specific AGC data. A fourth module comprises means 232, 328, 316 for controlling the gain of a received normal burst by the stored subscriber terminal-specific 150 AGC data. The second and third modules do not have to be located in the base station 100, but may be located elsewhere in the network part 128, in the base station controller 102, for example.

Although the invention is described herein with reference to the example in accordance with the accompanying drawings, it will be appreciated that the invention is not to be so limited, but it may be modified in a variety of ways within the scope of the inventive idea disclosed in the appended claims.

What is claimed is:

1. A method of automatic gain control AGC in a base station of a cellular radio network, comprising receiving at least one random access burst transmitted by a subscriber terminal of the cellular radio network on a random access channel;

measuring the received power of the random access burst;

generating subscriber terminal-specific AGC data on the basis of the received power of at least one random access burst;

storing subscriber terminal-specific AGC data;

receiving a normal burst transmitted by the subscriber terminal on a stand-alone dedicated control channel;

controlling the gain of the received normal burst by the subscriber terminal-specific AGC data;

performing analog-to-digital conversion on the gain-controlled normal burst.

2. A method as claimed in claim 1, further comprising:
generating the AGC data according to an average calculated for the reception levels of the random access bursts.

3. A method as claimed in claim 1, further comprising:
performing the AGC of a random access burst during extended tail bits of the random access burst.

4. A method as claimed in claim 1, further comprising:
receiving the normal burst transmitted by the subscriber terminal on a traffic channel and controlling its gain by the stored subscriber terminal-specific AGC data.

5. A method as claimed in claim 1, wherein the control data comprises subscriber terminal identifier data.

6. A method as claimed in claim 1, wherein the AGC is slow.

7. A method as claimed in claim 6, wherein analog-to-digital conversion is slow.

8. A method as claimed in claim 7, wherein the sampling frequency in the analog-to-digital converter is about 2 to 10 samples per symbol.

9. A network part in a cellular radio network, comprising:
a receiver for receiving at least one random access burst transmitted by a subscriber terminal of the cellular radio network on a random access channel;

means for measuring the received power of the random access burst;

control means for generating subscriber terminal-specific automatic gain control AGC data on the basis of the received power of at least one random access burst;

means for storing subscriber terminal-specific AGC data;

a receiver for receiving a normal burst transmitted by the subscriber terminal on a stand-alone dedicated control channel;

means for controlling the gain of the received normal burst by the subscriber terminal-specific AGC data; and an analog-to-digital converter for performing analog-to-digital conversion on the gain-controlled normal burst.

10. A network part as claimed in claim 9, wherein the control means produce the AGC data according to an average calculated for the received power of random access bursts.

11. A network part as claimed in claim 9, wherein the network part comprises means for performing the AGC of a random access burst during extended tail bits of the random access burst.

12. A network part as claimed in claim 9, wherein the network part comprises a receiver for receiving a normal burst transmitted by the subscriber terminal on a traffic channel and means for controlling its gain by the stored subscriber terminal-specific AGC data.

13. A network part as claimed in claim 9, wherein the means for storing the control data also store subscriber terminal identifier data.

14. A network part as claimed in claim 9, wherein the AGC is slow.

15. A network part as claimed in claim 14, wherein the analog-to-digital converter is slow.

16. A network part as claimed in claim 15, wherein the sampling frequency in the analog-to-digital converter is about 2 to 10 samples per symbol.

* * * * *